United States Patent
Fuse et al.

(10) Patent No.: US 11,718,144 B2
(45) Date of Patent: Aug. 8, 2023

(54) VEHICLE THERMAL MANAGEMENT SYSTEM, HEAT TRANSFER MEDIUM AND METHOD FOR COOLING VEHICLE DRIVING BATTERY

(71) Applicant: DENSO CORPORATION, Kariya (JP)

(72) Inventors: Takuya Fuse, Kariya (JP); Kouji Inagaki, Kariya (JP); Ryuta Kobayakawa, Kariya (JP); Shinya Kasamatsu, Kariya (JP); Saori Nakajima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/546,219

(22) Filed: Dec. 9, 2021

(65) Prior Publication Data

US 2022/0097479 A1     Mar. 31, 2022

Related U.S. Application Data

(60) Division of application No. 17/356,071, filed on Jun. 23, 2021, which is a continuation-in-part of
(Continued)

(30) Foreign Application Priority Data

Dec. 26, 2018    (JP) .............................. JP2018-243353

(51) Int. Cl.
*B60H 1/00*     (2006.01)
*C09K 5/10*     (2006.01)
(Continued)

(52) U.S. Cl.
CPC ..... *B60H 1/00278* (2013.01); *B60H 1/00328* (2013.01); *B60H 1/00385* (2013.01);
(Continued)

(58) Field of Classification Search
CPC ............ B60H 1/00278; B60H 1/00328; B60H 1/00385; B60H 1/00921; B60H 1/32284;
(Continued)

(56) References Cited

U.S. PATENT DOCUMENTS 4,738,904 A    4/1988   Ludwig et al.
6,120,925 A    9/2000   Kawatsu et al.
(Continued)

FOREIGN PATENT DOCUMENTS

CA     3042775 A1    5/2018
CN     1726269 A     1/2006
(Continued)

OTHER PUBLICATIONS

Decision to Grant a Patent issued in JP-2018-243353, granted as JP-6836210-B dated Dec. 24, 2020.
(Continued)

*Primary Examiner* — Ljiljana V. Ciric
(74) *Attorney, Agent, or Firm* — Harness, Dickey & Pierce, P.L.C.

(57) ABSTRACT

A vehicle thermal management system includes a vehicle driving battery that generates heat during charging and discharging and a liquid heat transfer medium that transfers heat received from the battery. The system further includes a heat receiver that causes the heat transfer medium to receive heat through heat exchange with the battery and that includes a portion in contact with the heat transfer medium and made of a material containing aluminum. The system further includes a refrigerant heat exchanger that causes the heat transfer medium to release heat through heat exchange with a refrigerant and that includes a portion in contact with the heat transfer medium and made of a material containing aluminum. The heat transfer medium includes a liquid base material including water, an orthosilicic acid ester compat-
(Continued)

ible with the liquid base material, and an azole derivative and has an electric insulation property.

8 Claims, 4 Drawing Sheets

Related U.S. Application Data application No. PCT/JP2019/049401, filed on Dec. 17, 2019.

(51) Int. Cl.
  *B60H 1/32* (2006.01)
  *C09K 5/00* (2006.01)
(52) U.S. Cl.
  CPC ......... *B60H 1/00921* (2013.01); *B60H 1/323* (2013.01); *B60H 1/32284* (2019.05); *C09K 5/00* (2013.01); *C09K 5/10* (2013.01); *B60H 1/00342* (2013.01); *B60H 2001/00307* (2013.01); *C09K 2205/00* (2013.01)
(58) Field of Classification Search
  CPC ................ B60H 1/323; B60H 1/00342; B60H 2001/00307; B60L 3/00; B60L 9/18; C09K 5/00; C09K 5/10; C09K 2205/00; F01P 3/12; F01P 3/18; H01M 8/04; Y02E 60/50
  See application file for complete search history.

(56) References Cited

U.S. PATENT DOCUMENTS

| | | | |
|---|---|---|---|
| 7,966,945 B1 | 6/2011 | Miller et al. | |
| 7,971,538 B1 | 7/2011 | Miller et al. | |
| 7,988,883 B2 | 8/2011 | Wehner et al. | |
| 8,006,627 B1 | 8/2011 | Miller et al. | |
| 8,066,902 B2 | 11/2011 | Yang et al. | |
| 8,117,969 B1 | 2/2012 | Miller et al. | |
| 8,171,860 B1 | 5/2012 | Miller et al. | |
| 8,381,658 B1 | 2/2013 | Miller et al. | |
| 8,658,326 B2 | 2/2014 | Marinho et al. | |
| 9,006,300 B2 * | 4/2015 | Gronwald | H01M 8/0289 429/479 |
| 9,564,647 B2 | 2/2017 | Nishiyama et al. | |
| 9,660,277 B2 | 5/2017 | Yang et al. | |
| 10,640,473 B2 | 5/2020 | Gill et al. | |
| 2002/0040896 A1 | 4/2002 | Ap | |
| 2004/0028971 A1 | 2/2004 | Wenderoth et al. | |
| 2004/0129920 A1 | 7/2004 | Wenderoth et al. | |
| 2006/0027782 A1 | 2/2006 | Wenderoth et al. | |
| 2006/0033074 A1 | 2/2006 | Wenderoth et al. | |
| 2006/0192174 A1 | 8/2006 | Wenderoth et al. | |
| 2006/0219975 A1 | 10/2006 | Wenderoth et al. | |
| 2007/0015026 A1 * | 1/2007 | Kanaoka | H01M 8/0289 429/494 |
| 2007/0075120 A1 | 4/2007 | Yang et al. | |
| 2007/0241306 A1 * | 10/2007 | Wehner | A23L 29/04 252/364 |
| 2008/0003480 A1 * | 1/2008 | Martin | C08G 73/22 528/391 |
| 2009/0130513 A1 | 5/2009 | Tsuchiya et al. | |
| 2009/0266519 A1 | 10/2009 | Marinho et al. | |
| 2010/0196773 A1 | 8/2010 | Yang et al. | |
| 2011/0003234 A1 * | 1/2011 | Martin | H01M 8/1072 429/492 |
| 2011/0183226 A1 | 7/2011 | Nishiyama et al. | |
| 2012/0231365 A1 * | 9/2012 | Gronwald | H01M 8/0289 429/479 |
| 2012/0270129 A1 | 10/2012 | Marinho et al. | |
| 2012/0288404 A1 | 11/2012 | Yang et al. | |
| 2016/0023688 A1 | 1/2016 | Berger et al. | |
| 2016/0318499 A1 | 11/2016 | Yamanaka et al. | |
| 2017/0009120 A1 * | 1/2017 | Yang | C09K 5/10 |
| 2019/0225855 A1 * | 7/2019 | Yang | C09K 5/10 |
| 2019/0352553 A1 * | 11/2019 | Dietl | H01M 8/04029 |
| 2020/0040244 A1 * | 2/2020 | Yang | C23F 11/126 |
| 2020/0398992 A1 | 12/2020 | Morrison | |
| 2021/0229822 A1 | 7/2021 | Morrison | |
| 2021/0316590 A1 | 10/2021 | Fuse et al. | |
| 2021/0328286 A1 * | 10/2021 | Fuse | B60H 1/00278 |
| 2021/0355362 A1 * | 11/2021 | Fuse | C09K 5/14 |
| 2021/0380862 A1 * | 12/2021 | Dietl | C09K 5/10 |

FOREIGN PATENT DOCUMENTS

| | | |
|---|---|---|
| DE | 102014110304 A1 | 1/2016 |
| DE | 112014006172 T5 | 10/2016 |
| JP | 2000323146 A | 11/2000 |
| JP | 2001167778 A | 6/2001 |
| JP | 2004524652 A | 8/2004 |
| JP | 2005500649 A | 1/2005 |
| JP | 2006057088 A | 3/2006 |
| JP | 2006510168 A | 3/2006 |
| JP | 2014203739 A | 10/2014 |
| JP | 2015131597 A | 7/2015 |
| WO | WO-2002/055630 A1 | 7/2002 |
| WO | WO-2008044446 A1 | 4/2008 |
| WO | WO-2018095759 A1 | 5/2018 |

OTHER PUBLICATIONS

Decision to Grant a Patent, Application No. JP-2018-243353, dated Dec. 24, 2020.
U.S. Appl. No. 17/356,071, filed Jun. 23, 2021, Takuya Fuse.

* cited by examiner

VEHICLE THERMAL MANAGEMENT SYSTEM, HEAT TRANSFER MEDIUM AND METHOD FOR COOLING VEHICLE DRIVING BATTERY

CROSS REFERENCE TO RELATED APPLICATIONS

This application is a divisional application of U.S. patent application Ser. No. 17/356,071 filed on Jun. 23, 2021 which is a continuation-in-part application of International Patent Application No. PCT/JP2019/049401 filed on Dec. 17, 2019, which designated the U.S. and claims the benefit of priority from Japanese Patent Application No. 2018-243353 filed on Dec. 26, 2018. The entire disclosure of all of the above application is incorporated herein by reference.

TECHNICAL FIELD

The present disclosure relates to a vehicle thermal management system mounted in a vehicle, a heat transfer medium, and a method for cooling a vehicle driving battery.

BACKGROUND ART

A typical thermal management system for a vehicle includes a vehicle driving battery that supplies electric power to a traveling motor, a liquid heat transfer medium that carries heat from the battery, a heat receiver at which the heat transfer medium receives heat from the battery through heat exchange, and a heat exchanger at which the heat transfer medium releases heat by exchanging the heat with refrigerant for a refrigeration cycle system. In this system, the battery is cooled by transferring heat from the battery to the refrigerant of the refrigeration cycle system via the heat transfer medium.

SUMMARY

In a first aspect of the present disclosure, a vehicle thermal management system includes a vehicle driving battery, a liquid heat transfer medium, a heat receiver, and a refrigerant heat exchanger. The vehicle driving battery is configured to be charged with electric power supplied from an external power source and generates heat during charging and discharging. The liquid heat transfer medium transfers the heat received from the battery. The heat receiver is configured to cause the heat transfer medium to receive the heat through heat exchange with the battery. The heat receiver includes a portion that is in contact with the heat transfer medium and is made of a material containing aluminum. The refrigerant heat exchanger is configured to cause the heat transfer medium to release the heat through heat exchange with a refrigerant for a cooling cycle system. The refrigerant heat exchanger includes a portion that is in contact with the heat transfer medium and is made of a material containing aluminum. The heat transfer medium includes a liquid base material including water and an orthosilicic acid ester compatible with the liquid base material and does not include an ionic rust inhibitor. The orthosilicic acid ester is present, as a concentration of silicon, relative to a total mass of the heat transfer medium within a range between 1 mass ppm, inclusive, and 2000 mass ppm, inclusive or within a range between 2000 mass ppm, non-inclusive, and 10000 mass ppm, inclusive.

In a second aspect of the present disclosure, a vehicle thermal management system mounted in a vehicle includes a vehicle driving battery, a liquid heat transfer medium, a heat receiver, and a refrigerant heat exchanger. The vehicle driving battery is configured to be charged with electric power supplied from an external power source and generates heat during charging and discharging. The liquid heat transfer medium transfers the heat received from the battery. The heat receiver is configured to cause the heat transfer medium to receive the heat through heat exchange with the battery. The heat receiver includes a portion that is in contact with the heat transfer medium and is made of a material containing aluminum. The refrigerant heat exchanger is configured to cause the heat transfer medium to release the heat through heat exchange with a refrigerant for a cooling cycle system. The refrigerant heat exchanger includes a portion that is in contact with the heat transfer medium and is made of a material containing aluminum. The heat transfer medium includes a liquid base material including water, an orthosilicic acid ester compatible with the liquid base material, and an azole derivative and has an electric insulation property.

In a third aspect of the present disclosure, a heat transfer medium for a vehicle thermal management system that includes a vehicle driving battery, a heat receiver, and a refrigerant heat exchanger. The vehicle driving battery is configured to be charged with electric power supplied from an external power source and generates heat during charging and discharging. The heat receiver is configured to cause the heat transfer medium to receive the heat through heat exchange with the battery. The heat receiver includes a portion that is in contact with the heat transfer medium and is made of a material containing aluminum. The refrigerant heat exchanger is configured to cause the heat transfer medium to release the heat through heat exchange with a refrigerant for a cooling cycle system. The refrigerant heat exchanger includes a portion that is in contact with the heat transfer medium and is made of a material containing aluminum. The heat transfer medium includes a liquid base material including water, an orthosilicic acid ester compatible with the liquid base material, and an azole derivative. The heat transfer medium has an electric insulation property.

In a fourth aspect of the present disclosure, a heat transfer medium for a vehicle thermal management system that includes a vehicle driving battery, a heat receiver, and a refrigerant heat exchanger. The vehicle driving battery is configured to be charged with electric power supplied from an external power source and generates heat during charging and discharging. The heat receiver is configured to cause the heat transfer medium to receive the heat through heat exchange with the battery. The heat receiver includes a portion that is in contact with the heat transfer medium and is made of a material containing aluminum. The refrigerant heat exchanger is configured to cause the heat transfer medium to release the heat through heat exchange with a refrigerant for a cooling cycle system. The refrigerant heat exchanger includes a portion that is in contact with the heat transfer medium and is made of a material containing aluminum.

The heat transfer medium includes a liquid base material including water and an orthosilicic acid ester compatible with the liquid base material. The heat transfer medium does not include an ionic rust inhibitor. The orthosilicic acid ester is present, as a concentration of silicon, relative to a total mass of the heat transfer medium within a range between 1 mass ppm, inclusive, and 2000 mass ppm, inclusive or within a range between 2000 mass ppm, non-inclusive, and 10000 mass ppm, inclusive.

In a fifth aspect of the present disclosure, a method for cooling a vehicle driving battery that generates heat during charging and discharging includes circulating a heat transfer medium through a heat transfer medium circuit. The heat transfer medium includes a liquid base material including water, an orthosilicic acid ester compatible with the liquid base material, and an azole derivative. The heat transfer medium has an electric insulation property. The method further includes causing, at a heat receiver including a portion that is in contact with the heat transfer medium and is made of a material containing aluminum, the heat transfer medium to receive the heat through heat exchange between the heat transfer medium and the battery that is configured to be charged with electric power supplied from an external power source and causing, at a refrigerant heat exchanger including a portion that is in contact with the heat transfer medium and is made of a material containing aluminum, the heat transfer medium to release the heat through heat exchange between a refrigerant for a cooling cycle circuit and the heat transfer medium having received the heat.

In a sixth aspect of the present disclosure, a method for cooling a vehicle driving battery that generates heat during charging and discharging includes circulating a heat transfer medium through a heat transfer medium circuit. The heat transfer medium includes a liquid base material including water and an orthosilicic acid ester compatible with the liquid base material, the orthosilicic acid ester being present, as a concentration of silicon, relative to a total mass of the heat transfer medium within a range between 1 mass ppm, inclusive, and 2000 mass ppm, inclusive or within a range between 2000 mass ppm, non-inclusive, and 10000 mass ppm, inclusive. The heat transfer medium does not include an ionic rust inhibitor. The method further includes causing, at a heat receiver including a portion that is in contact with the heat transfer medium and is made of a material containing aluminum, the heat transfer medium to receive the heat through heat exchange between the heat transfer medium and the battery that is configured to be charged with electric power supplied from an external power source and causing, at a refrigerant heat exchanger including a portion that is in contact with the heat transfer medium and is made of a material containing aluminum, the heat transfer medium to release the heat through heat exchange between a refrigerant for a cooling cycle circuit and the heat transfer medium having received the heat.

DESCRIPTION OF EMBODIMENTS

Figure 1:
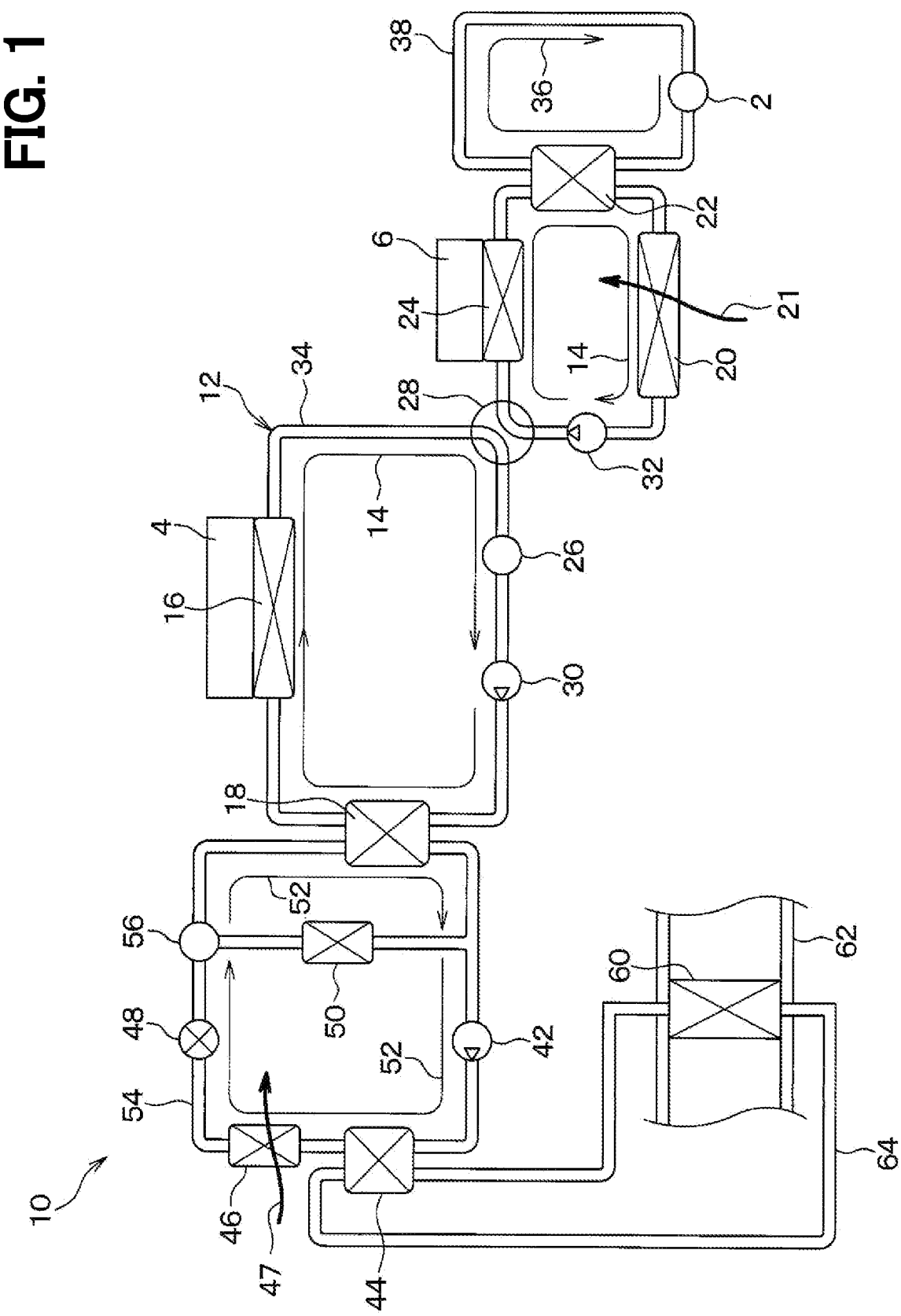
FIG. 1 is a schematic view showing an overall configuration of a vehicle thermal management system according to a first embodiment where a flow of a heat transfer medium is illustrated when the heat transfer medium is at a first flow state.

To begin with, a relevant technology will be described only for understanding the following embodiments. In a vehicle thermal management system, if the heat transfer medium has a high electrical conductivity, a short circuit occurs when the heat transfer medium is leaked and comes into contact with the battery. As a countermeasure to this, the flow rate of the heat transfer medium flowing through the heat receiver needs to be decreased so as to prevent the heat transfer medium from leaking. Alternatively, it may be necessary to set a partition wall between the battery and the heat receiver so that the leaked heat transfer medium does not come into contact with the battery. As further another measure, an installation space in the heat receiver for the battery needs to be small to reduce a contact area between the leaked heat transfer medium and the battery.

However, if these measures are taken, the amount of heat transferred from the battery to the heat transfer medium would be decreased. Therefore, cooling capacity of the refrigeration cycle system cannot be sufficiently performed when cooling the battery.

One objective of the present disclosure is to provide a vehicle thermal management system that is capable of sufficiently providing a cooling performance of a refrigeration cycle system when cooling a battery.

As described above, one aspect of the present disclosure is a vehicle thermal management system mounted in a vehicle. The system includes a vehicle driving battery, a liquid heat transfer medium, a heat receiver, and a refrigerant heat exchanger. The vehicle driving battery is configured to be charged with electric power supplied from an external power source and generates heat during charging and discharging. The liquid heat transfer medium transfers the heat received from the battery. The heat receiver is configured to cause the heat transfer medium to receive the heat through heat exchange with the battery. The heat receiver includes a portion that is in contact with the heat transfer medium and is made of a material containing aluminum. The refrigerant heat exchanger is configured to cause the heat transfer medium to release the heat through heat exchange with a refrigerant fora cooling cycle system. The refrigerant heat exchanger includes a portion that is in contact with the heat transfer medium and is made of a material containing aluminum. The heat transfer medium includes a liquid base material including water and an orthosilicic acid ester compatible with the liquid base material and does not include an ionic rust inhibitor.

According to this, the heat transfer medium includes an orthosilicic acid ester and does not include an ionic rust inhibitor. Since the heat transfer medium includes the orthosilicic acid ester, the heat transfer medium has a rust inhibiting property. Therefore, the heat transfer medium need not include an ionic rust inhibitor. Since the heat transfer medium does not include an ionic rust inhibitor, the heat transfer medium has a low electrical conductivity and a high electric insulation property as compared with a heat transfer medium containing an ionic rust inhibitor.

In this system, a heat transfer medium having a high electric insulation property is used. This eliminates the need for taking the above-mentioned measures against a liquid short circuit. Therefore, it is possible to avoid a situation where the amount of heat transferred from the battery to the heat transfer medium is reduced by taking the above-mentioned measures against the liquid short circuit. In other words, according to this system, the flow rate of the heat transfer medium can be set or the heat receiver can be used for the battery so that the amount of heat transferred from the battery to the heat transfer medium is increased without the concern of occurrence of the short circuit. Therefore, the cooling performance of the refrigeration cycle system can be sufficiently provided when cooling the battery.

Hereinafter, embodiments of the present disclosure will be described with reference to the drawings. In the following embodiments, the same or equivalent parts are denoted by the same reference numerals as each other, and explanations will be provided to the same reference numerals for simplifying descriptions.

First Embodiment

The vehicle thermal management system 10 shown in FIG. 1 is mounted in an electric vehicle. Hereinafter, the vehicle thermal management system 10 is simply referred to as a "system 10". The electric vehicle receives a driving force from a traveling electric motor 2. For example, the electric vehicle may be an electrically-powered vehicle, a plug-in hybrid vehicle, an electric two-wheeled vehicle, or the like. The number of wheels and usage of the electric vehicle are not limited to the above-described examples. The electric vehicle includes the traveling electric motor 2, a battery 4, and an inverter 6.

The traveling electric motor 2 is a motor generator that converts electric power supplied from the battery 4 into driving power for the vehicle, and also converts the driving power for the vehicle into electric power during deceleration of the vehicle. The traveling electric motor 2 generates heat during the power conversion between the driving power and the electric power.

The battery 4 is a battery for traveling the vehicle and is configured to supply electric power to the traveling electric motor 2. The battery 4 is charged with electric power supplied from the traveling electric motor 2 during deceleration of the vehicle. The battery 4 can also be charged with electric power supplied from an external power source (that is, a commercial power source) when the vehicle is stopped. The battery 4 generates heat during charging and discharging.

The inverter 6 is a power conversion device that converts electric power supplied from the battery 4 to the traveling electric motor 2 from direct current into alternating current. Further, the inverter 6 converts the electric power supplied from the traveling electric motor 2 to the battery 4 from alternating current to direct current. The inverter 6 generates heat when converting the electric power.

The system 10 includes the battery 4, a heat transfer medium 14, a heat receiver 16, a refrigerant heat exchanger 18, an air heat exchanger 20, an oil heat exchanger 22, an inverter heat exchanger 24, an ion exchanger 26, a flow path switching unit 28, a first pump 30, a second pump 32, and a hose 34.

The heat transfer medium 14 is liquid and carries the heat received from the battery 4. The heat transfer medium 14 includes a liquid base material and an orthosilicic acid ester and does not include an ionic rust inhibitor.

The base material is a base for the heat transfer medium 14. The base material is used in a liquid form. As the base material, water containing a freezing point depression agent is used. Water is used since it has a large heat capacity, is inexpensive, and has a low viscosity. The freezing point depression agent is added to the water so that the water can be kept in a liquid form even when an environmental temperature falls below the freezing point. The freezing point depression agent dissolves in water and lowers the freezing point of the water. As the freezing point depression agent, an organic alcohol (e.g., alkylene glycol or a derivative thereof) is used. As the alkylene glycol, monoethylene glycol, monopropylene glycol, polyglycol, glycol ether, or glycerin may be used alone or as a mixture thereof. The freezing point depression agent is not necessarily limited to organic alcohol, and inorganic salts and the like may be used.

The orthosilicic acid ester is compatible with the base material. The orthosilicic acid ester is a compound for imparting a rust inhibitive property to the heat transfer medium 14. Since the heat transfer medium 14 includes the orthosilicic acid ester, the heat transfer medium 14 has a rust inhibitive property. Therefore, the heat transfer medium 14 need not include an ionic rust inhibitor.

As the orthosilicic acid ester, a compound represented by general formula (I) is used.

[Chemical Formula 1]

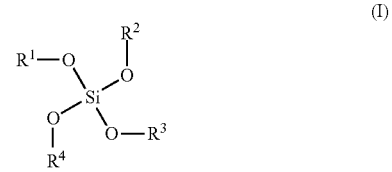

(I)

In general formula (I), each of the substituents R1 to R4 are the same or different from each other, and is an alkyl substituent having 1 to 20 carbon atoms, an alkenyl substituent having 2 to 20 carbon atoms, a hydroxyalkyl substituent having 1 to 20 carbon atoms, a substituted or unsubstituted aryl group having 6 to 12 carbon atoms, and/or a glycol ether-substituent of a formula—(CH2-CH2-O)n-R5. R5 represents hydrogen or alkyl having 1 to 5 carbon atoms. n represents any one of numbers of 1 to 5.

Typical examples of the orthosilicic acid ester may be pure tetraalkoxysilanes such as tetramethoxysilanes, tetraethoxysilanes, tetra (n-propoxy) silanes, tetra (isopropoxy) silanes, tetra (n-butoxy) silanes, tetras. (t-butoxy) silane, tetra (2-ethylbutoxy) silane, or tetra (2-ethylhexoxy) silane, as well as tetraphenoxysilane, tetra (2-methylphenoxy) silane, tetravinyloxysilane, tetraallyloxysilane, tetra (2-hydroxyethoxy) silane, tetra (2-ethoxyethoxy) silane, tetra (2-butoxyethoxy) silane, tetra (1-methoxy-2-propoxy) silane, tetra (2-methoxyethoxy) silane or tetra [2-[2-(2-methoxyethoxy) ethoxy] ethoxy] silane.

It is preferable to use, as the orthosilicic acid ester, a compound where in general formula (I) the substituents R1 to R4 are the same as each other and are the alkyl substituents having 1 to 4 carbon atoms or the glycol ether substituents of the formula-(CH2-CH2-O) n-R5, the substituent R5 is hydrogen, methyl, or ethyl, and n represents a number of 1, 2 or 3.

The orthosilicic acid ester is included in the heat transfer medium 14 so that the orthosilicic acid ester is present, as a concentration of silicon, relative to a total mass of the heat transfer medium within a range between 1 to 10000 mass ppm. Preferably, the mass concentration of the silicon is set to fall within the range of 1 mass ppm, inclusive, to 2000 mass ppm, inclusive. Alternatively, the concentration of the silicon is preferably set to fall within the range of 2000 mass ppm, non-inclusive, to 10000 mass ppm, inclusive. The above orthosilicic acid ester is commercially available or can be produced by transesterifying 1 equivalent of tetramethoxysilane with 4 equivalents of a corresponding long chain alcohol or phenol and then by distilling off methanol.

Since the heat transfer medium 14 does not include an ionic rust inhibitor, the heat transfer medium 14 has electrical conductivity that is lower than that of a heat transfer medium containing an ionic rust inhibitor. The electrical conductivity of the heat transfer medium 14 is set to be 50 µS/cm or less, preferably fall within the range of 1 µS/cm, inclusive, to 5 µS/cm, inclusive. An engine cooling water used for cooling a vehicle engine is an example of a heat transfer medium containing an ionic rust inhibitor and a liquid base material including water. Typically, an engine cooling water has electrical conductivity of 4000 µS/cm or more. In this way, the heat transfer medium containing an ionic rust inhibitor has high electrical conductivity and therefore does not have an electrical insulation property.

Alternatively, the heat transfer medium 14 may include an azole derivative as a rust inhibitor in addition to the orthosilicic acid ester.

The heat receiver 16 receives heat from the heat transfer medium 14 by exchanging heat with the battery 4. Heat is transferred from the battery 4 to the heat transfer medium 14 via constituting members of the heat receiver 16. The heat receiver 16 may be configured so that the battery 4 is immersed in the heat transfer medium 14 and heat is directly transferred from the battery 4 to the heat transfer medium 14.

The refrigerant heat exchanger 18 is a heat exchanger that is configured to cause the heat transfer medium 14 to release heat through heat exchange with a refrigerant 52 of a cooling cycle system. The air heat exchanger 20 is a heat exchanger that is configured to cause the heat transfer medium 14 to release heat by exchanging heat with air 21 outside of the vehicle. The air 21 is supplied to the air heat exchanger 20 by operating a blower (not shown).

The oil heat exchanger 22 is a heat exchanger that is configured to cause the heat transfer medium 14 to receive heat from an oil 36 through heat exchange with the oil 36 that has received heat from the travelling electric motor 2. The oil heat exchanger 22 is connected to an oil passage portion of the travelling electric motor 2 via a pipe 38 through which the oil 36 flows.

The inverter heat exchanger 24 is a heat exchanger that is configured to cause the heat transfer medium 14 to receive heat through heat exchange with the inverter 6. Each of the heat receiver 16, the refrigerant heat exchanger 18, the air heat exchanger 20, the oil heat exchanger 22, and the inverter heat exchanger 24 includes a portion that is in contact with the heat transfer medium 14 and is made of a material including aluminum.

The ion exchanger 26 is configured to capture ions generated in the heat transfer medium 14. The ion exchanger 26 includes an ion exchanging member and a filtering member. As the ion exchanging member, an anionic resin or a cationic resin may be used. As the filtering member, an activated carbon filter may be used.

Each of the first pump 30 and the second pump 32 is a fluid mechanism that feeds the heat transfer medium 14. The hose 34 is a flow passage forming member that forms a flow passage through which the heat transfer medium 14 flows.

The heat receiver 16, the refrigerant heat exchanger 18, the air heat exchanger 20, the oil heat exchanger 22, the inverter heat exchanger 24, the ion exchanger 26, the flow path switching unit 28, the first pump 30, and the second pump 32 are connected to each other through the hose 34. As a result, the heat transfer medium circuit 12 in which the heat transfer medium 14 circulates is formed.

Specifically, the heat receiver 16, the flow path switching unit 28, the ion exchanger 26, the first pump 30, and the refrigerant heat exchanger 18 are connected to each other in an annular shape. Further, the flow path switching unit 28, the inverter heat exchanger 24, the oil heat exchanger 22, the air heat exchanger 20, and the second pump 32 are connected to each other in an annular shape.

Figure 2:
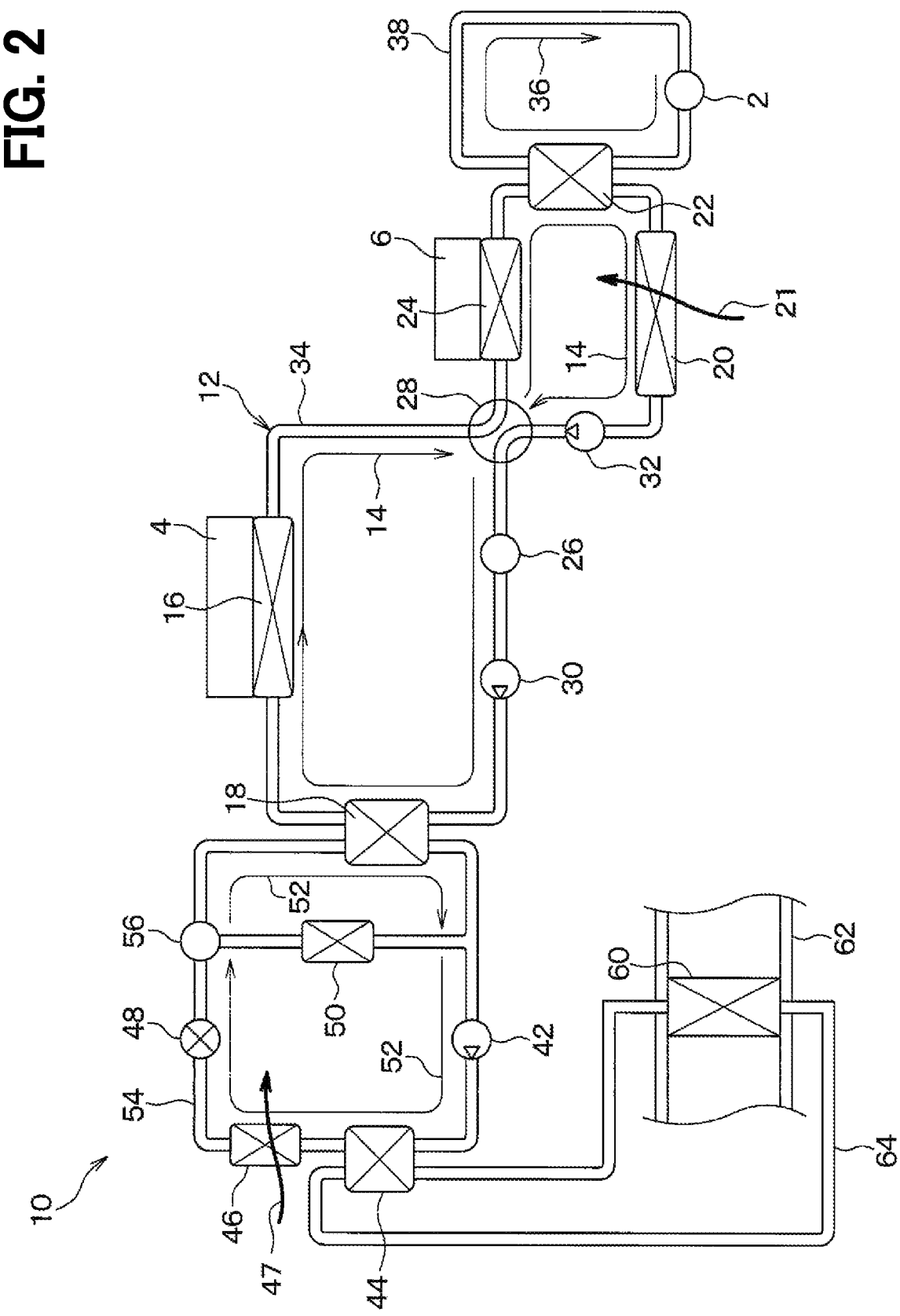
FIG. 2 is a schematic view showing an overall configuration of the vehicle thermal management system according to the first embodiment where a flow of the heat transfer medium is illustrated when the heat transfer medium is at a second flow state.
Figure 3:
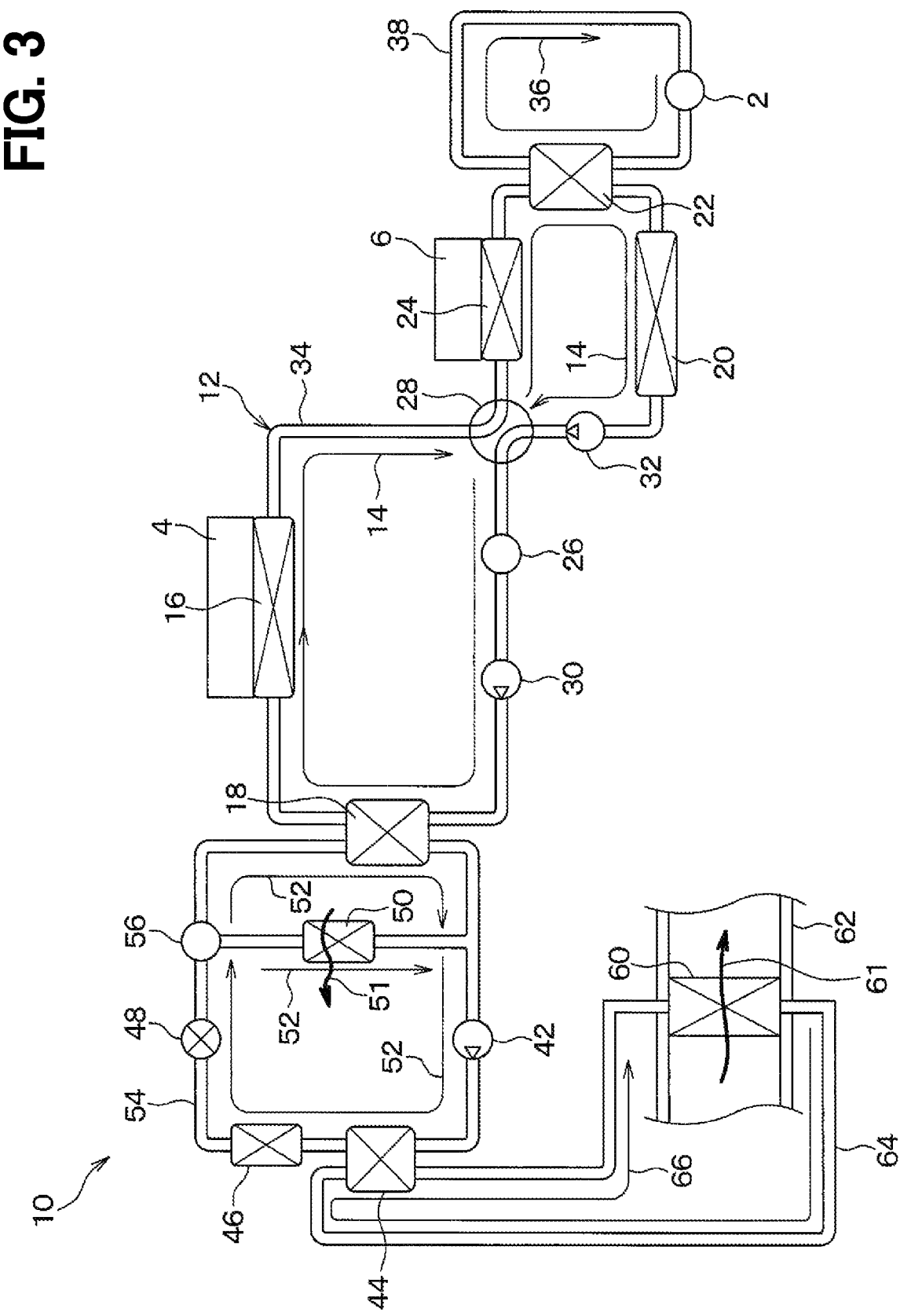
FIG. 3 is a schematic view showing an overall configuration of the vehicle thermal management system according to the first embodiment where a flow of the heat transfer medium is illustrated when the heat transfer medium is at the second flow state and flows of a refrigerant and a hot water are illustrated during a vehicle cabin heating mode.

The flow path switching unit 28 switches a flow state of the heat transfer medium 14 between a first flow state and a second flow state. The first flow state is a state where, as shown in FIG. 1, the heat transfer medium 14 circulates through the first pump 30, the refrigerant heat exchanger 18, the heat receiver 16, the ion exchanger 26, and the first pump 30 in this order, and in addition to this flow, the heat transfer medium 14 circulates through the second pump 32, the inverter heat exchanger 24, the oil heat exchanger 22, the air heat exchanger 20, and the second pump 32 in this order. The second flow state is a state where, as shown in FIGS. 2 and 3, the heat transfer medium 14 circulates through the first pump 30, the refrigerant heat exchanger 18, the heat receiver 16, the inverter heat exchanger 24, the oil heat exchanger 22, the air heat exchanger 20, the second pump 32, the ion exchanger 26, and the first pump 30 in this order.

Further, as shown in FIG. 1, the system 10 includes a compressor 42, a first refrigerant radiator 44, a second refrigerant radiator 46, an expansion valve 48, and a refrigerant heat absorber 50. These devices 42, 44, 46, 48, 50 and the refrigerant heat exchanger 18 constitute a vapor-compression-type refrigeration cycle system. These devices 42, 44, 46, 48, 50 and the refrigerant heat exchanger 18 are connected to each other through a pipe 54 through which the refrigerant 52 flows.

The compressor 42 compresses and discharges sucked refrigerant. The first refrigerant radiator 44 is a heat exchanger that causes the refrigerant 52 to release heat through heat exchange between a hot water 66 shown in FIG. 3 and the refrigerant 52. The second refrigerant radiator 46 is a heat exchanger that causes the refrigerant 52 to release heat through heat exchange between an air 47 outside of the vehicle (see FIGS. 1 and 2) and the refrigerant 52. By operating a blower (not shown), an air 47 outside of the vehicle is supplied to the second refrigerant radiator 46. The expansion valve 48 decompresses and expands the refrigerant 52. The refrigerant heat exchanger 50 is a heat exchanger that causes the refrigerant 52 to absorb heat through heat exchange between the refrigerant 52 and the air 51 outside of the vehicle as shown in FIG. 3. The refrigerant heat exchanger 18 is also a heat absorber that causes the refrigerant 52 to absorb heat through heat exchange between the refrigerant 52 and the heat transfer medium 14.

The system 10 includes a refrigerant switching unit 56. The refrigerant switching unit 56 is configured to switch a flow state of the refrigerant between a flow state where the refrigerant exiting the expansion valve 48 flows through only the refrigerant heat exchanger 18 and a flow state where the refrigerant exiting the expansion valve 48 flows through both the refrigerant heat exchanger 18 and the refrigerant heat absorber 50. In this embodiment, a three-way valve is used as the refrigerant switching unit 56. However, another valve may be used as the refrigerant switching unit 56.

The system 10 also includes a heater core 60. The heater core 60 is disposed inside an unit case 62 of an air-conditioning unit mounted in the vehicle. The heater core 60 is connected to the first refrigerant radiator 44 via a pipe 64. As shown in FIG. 3, the hot water 66 that has exchanged heat with the refrigerant 52 at the first refrigerant radiator 44 flows through the heater core 60. The heater core 60 heats the air 61 flowing into the vehicle cabin through heat exchange between the hot water 66 and the air 61 flowing into the vehicle cabin. As described above, in the present embodiment, the refrigeration cycle system is used in the air-conditioner for a vehicle. In other words, the refrigeration cycle system is used for air-conditioning in the vehicle cabin.

In the system 10 of the present embodiment, a first cooling mode for cooling the battery 4 using only the refrigerant heat exchanger 18 as a radiator that causes the heat transfer medium 14 to release heat, a second cooling mode for cooling the battery 4 using both the refrigerant heat exchanger 18 and the air heat exchanger 20 as radiators that cause the heat transfer medium 14 to release heat, and the second cooling mode as well as a vehicle cabin heating mode are selectively performed.

(First Cooling Mode for the Battery 4)

During this mode, in the heat transfer medium circuit 12, the flow path switching unit 28 sets the flow state of the heat transfer medium 14 to the first flow state, as shown in FIG. 1. In the refrigeration cycle circuit, the refrigerant switching unit 56 sets the refrigerant flow state to a flow state where the refrigerant 52 exiting the expansion valve 48 flows only through the refrigerant heat exchanger 18. The circulation of the hot water 66 between the first refrigerant radiator 44 and the heater core 60 is stopped. The air 47 outside of the vehicle is supplied to the second refrigerant radiator 46.

By operating the first pump 30, the heat transfer medium 14 circulates through the heat receiver 16, the ion exchanger 26, and the refrigerant heat exchanger 18 in this order. At this time, the heat transfer medium 14 receives heat from the battery 4 at the heat receiver 16. The heat transfer medium 14 releases heat to the refrigerant 52 at the refrigerant heat exchanger 18. Thus, the battery 4 is cooled. On the other hand, the refrigerant 52 releases heat to the air 47 outside of the vehicle at the second refrigerant radiator 46.

Further, when the heat transfer medium 14 flows through the heat transfer medium circuit 12, ions are generated in the heat transfer medium 14 for various reasons. The generated ions are captured by the ion exchanger 26.

By operating the second pump 32, the heat transfer medium 14 circulates through the inverter heat exchanger 24, the oil heat exchanger 22, and the air heat exchanger 20 in this order. At this time, the heat transfer medium 14 receives heat from the inverter 6 at the inverter heat exchanger 24. The heat transfer medium 14 receives heat from the oil 36 at the oil heat exchanger 22. The heat transfer medium 14 releases heat to the air 21 at the air heat exchanger 20. As a result, the inverter 6 and the driving electric motor 2 are cooled.

(Second Cooling Mode for the Battery 4)

During this mode, in the heat transfer medium circuit 12, the flow path switching unit 28 sets the flow state of the heat transfer medium 14 to the second flow state, as shown in FIG. 2. The state of the refrigeration cycle circuit is the same as that of cooling the battery 4 using only the refrigerant 52.

By operating the first pump 30 and the second pump 32, the heat transfer medium 14 circulates through the heat receiver 16, the inverter heat exchanger 24, the oil heat exchanger 22, the air heat exchanger 20, the ion exchanger 26, and the refrigerant heat exchanger 18 in this order. At this time, the heat transfer medium 14 receives heat from the battery 4, the inverter 6, and the oil 36. The heat transfer medium 14 releases heat to the refrigerant 52 at the refrigerant heat exchanger 18 and releases heat to the air 21 at the air heat exchanger 20. As a result, the battery 4, the inverter 6, and the electric motor 2 are cooled.

(Second Cooling Mode for the Battery 4 and Vehicle Cabin Heating Mode)

During this mode, the flow state of the heat transfer medium circuit 12 is the same as the flow state during the second cooling mode for the battery 4 as described above. As shown in FIG. 3, in the refrigeration cycle circuit, the refrigerant switching unit 56 sets the refrigerant flow state to a flow state where the refrigerant 52 exiting the expansion valve 48 flows through both the refrigerant heat exchanger 18 and the refrigerant heat absorber 50. In this state, the hot water 66 circulates between the first refrigerant radiator 44 and the heater core 60. The supply of the air 47 outside of the vehicle cabin to the second refrigerant radiator 46 is stopped.

As a result, the refrigerant 52 discharged from the compressor 42 flows through both the refrigerant heat exchanger 18 and the refrigerant heat absorber 50 after flowing through the first refrigerant radiator 44, the second refrigerant radiator 46, and the expansion valve 48. At this time, the refrigerant 52 absorbs heat from the heat transfer medium 14 at the refrigerant heat exchanger 18 and absorbs heat from the air 51 outside of the vehicle at the refrigerant heat absorber 50. The heat transfer medium 14 releases heat to the hot water 66 at the first refrigerant radiator 44. Then, the air 61 for heating the vehicle cabin is heated by the hot water 66 at the heater core 60. In this way, the interior of the vehicle is heated.

Next, advantages of the present embodiment will be described.

(1) In the present embodiment, the system 10 includes the battery 4, the heat transfer medium 14, the heat receiver 16, and the refrigerant heat exchanger 18. The heat transfer medium 14 includes a liquid base material and an orthosilicic acid ester and does not include an ionic rust inhibitor.

Accordingly, since the heat transfer medium includes the orthosilicic acid ester, the heat transfer medium has a rust inhibitive property. Therefore, the heat transfer medium 14 need not include an ionic rust inhibitor. Since this heat transfer medium 14 does not include an ionic rust inhibitor, the electrical conductivity of the heat transfer medium is low and the electric insulation is high as compared with a heat transfer medium containing an ionic rust inhibitor.

In this system 10, the heat transfer medium 14 having high electric insulation property is used. This eliminates the need for taking the above-mentioned measures against a liquid short circuit. Therefore, it is possible to avoid a situation where the amount of heat transferred from the battery 4 to the heat transfer medium 14 is reduced by taking the above-mentioned measures against the liquid short circuit. In other words, according to this system 10, the flow rate of the heat transfer medium 14 can be set and/or the heat receiver 16 can be used for the battery 4 so that the amount of heat transferred from the battery 4 to the heat transfer medium 14 can be increased without a concern about the short circuit. Therefore, the cooling performance of the refrigeration cycle system can be sufficiently provided when cooling the battery 4.

Therefore, according to the present embodiment, the battery 4 can be cooled during quick charging using an external power source. That is, when the required time for quick charging of the battery 4 is shortened, the amount of heat generated by the battery 4 increases. According to the present embodiment, since the cooling performance by the cooling cycle system can be sufficiently provided, the required time for quick charging of the battery 4 can be shortened.

Furthermore, the refrigerant heat exchanger 18 is a heat absorber that causes the refrigerant to absorb heat. According to this system 10, when the first refrigerant radiator 44 of the refrigeration cycle system is used to heat the vehicle cabin, the exhaust heat from the battery 4 can be used as a heat source for the heat absorber of the refrigeration cycle system.

(2) The system 10 further includes the air heat exchanger 20. Accordingly, if a heat amount released from the heat transfer medium 14 only at the refrigerant heat exchanger 18 is insufficient, the heat transfer medium 14 can also release heat at the air heat exchanger 20. In this way, as compared with a situation where the heat transfer medium 14 releases heat only at the refrigerant heat exchanger 18, a heat releasing amount from the heat transfer medium 18 can be increased by allowing the heat transfer medium 18 to release heat at both the refrigerant heat exchanger 18 and the air heat exchanger 20. Therefore, the battery cooling capacity of the system 10 can be increased.

(3) The system 10 further includes the oil heat exchanger 22 and the inverter heat exchanger 24. According to this, the traveling electric motor 2 and the inverter 6 can be cooled using the heat transfer medium 14.

Further, according to this system 10, as shown in FIG. 3, when the first refrigerant radiator 44 of the refrigeration cycle circuit is used for heating the vehicle interior, both the exhaust heat from the electric motor 2 and the exhaust heat from the inverter 6 can be used as a heat source for the heat absorber of the cooling cycle system in addition to the exhaust heat from the battery 4. Therefore, a heat absorbing amount can be increased as compared with a situation where only the air outside of the vehicle serves as the heat source for the heat absorber of the refrigeration cycle system. Accordingly, the heating capacity of the refrigeration cycle system can be improved.

(4) Each of the heat receiver 16, the refrigerant heat exchanger 18, the air heat exchanger 20, the oil heat exchanger 22, and the inverter heat exchanger 24 includes the portion that is in contact with the heat transfer medium 14 and is made of a material including aluminum. The base material of the heat transfer medium 14 includes water.

When the portion in contact with the heat transfer medium 14 is made of a material containing aluminum and the heat transfer medium 14 includes water, hydrogen may be generated due to electrochemical reaction of the water at the portion in contact with the heat transfer medium 14. However, since the heat transfer medium 14 includes the orthosilicic acid ester, generation of the hydrogen can be suppressed. This has been confirmed through experiments conducted by the inventors of the present disclosure. It should be noted that all the heat receiver 16, the refrigerant heat exchanger 18, the air heat exchanger 20, the oil heat exchanger 22, and the inverter heat exchanger 24 do not necessarily include the portions in contact with the heat transfer medium 14, but at least one of them includes the portion that is in contact with the heat transfer medium 14 and is made of a material containing aluminum.

(5) The system 10 further includes the ion exchanger 26. Accordingly, even if ions are generated in the heat transfer medium 14, the ions can be captured by the ion exchanger 26. Therefore, the high electric insulation of the heat transfer medium 14 can be maintained.

Second Embodiment

In the first embodiment, the heat transfer medium 14 does not include an ionic rust inhibitor. However, as long as the heat transfer medium 14 has an electric insulation property, the heat transfer medium 14 may contain an ionic rust inhibitor. For example, nitrite, molybdate, chromate, phosphonate, phosphate, sebacic acid, and triazole compounds may be used as the ionic rust inhibitor. The phrase "the heat transfer medium 14 has an electric insulation property" used herein means that the heat transfer medium 14 has electrical conductivity of 500 µS/cm or less. This electrical conductivity is a measured value at a room temperature, for example, 25° C. According to experimental results conducted by the present inventors, when the electrical conductivity of the heat transfer medium 14 is 500 µS/cm or less, it is possible to avoid occurrence of short circuit even when the heat transfer medium 14 is leaked and comes into contact with the battery 4. In order to avoid occurrence of the short circuit, the electrical conductivity of the heat transfer medium 14 is preferably 100 µS/cm or less, and more preferably 10 µS/cm or less.

Even in this case, since the heat transfer medium 14 includes the orthosilicic acid ester, the heat transfer medium 14 has a rust inhibitive property. Therefore, the amount of the ionic rust inhibitor included in the heat transfer medium 14 with the orthosilicic acid ester can be reduced as compared with the heat transfer medium 14 including the ionic rust inhibitor without the orthosilicic acid ester (e.g., engine cooling water). That is, the electrical conductivity of the heat transfer medium 14 can be lowered as compared with the heat transfer medium 14 with an ionic rust inhibitor but without the orthosilicic acid ester. As a result, an electrical insulation property can be given to the heat transfer medium 14.

Furthermore, the inventors of the present disclosure have found the following facts through experiments. As described above, the orthosilicic acid ester in the heat transfer medium works to prevent ions from generating from the heat receiver 16 or the air heat exchanger 20, each of which includes a portion made of a material containing aluminum. However, if the amount of the orthosilicic acid ester in the heat transfer medium increases, a precipitation of the orthosilicic acid ester would be formed in the heat transfer medium. In view of this, the inventors of the present disclosure add a triazole compound to the heat transfer medium as an ion rust inhibitor. As a result, the triazole compound is found to work, in addition to as an ion rust inhibitor, as a precipitation inhibitor (i.e., prevent the orthosilicic acid ester from precipitating in the heat transfer medium).

Experiment

Here, the inventor of the present disclosure have conducted an experiment to identify an appropriate amount of a triazole compound relative to the orthosilicic acid ester in the heat transfer medium. In Table 1 below, Example 1 shows a heat transfer medium according to the present embodiment. The heat transfer medium of Example 1 includes, as an orthosilicic acid ester, a tetraetoxysilane (TEOS) in an amount of 150 mass ppm as silicon atoms based on the total amount of the heat transfer medium. The heat transfer medium of Example 1 also includes a triazole of 2000 mass ppm relative to the entire heat transfer medium. Thus, the total amount of the orthosilicic acid ester as silicon atoms and the triazole based on the total amount of the heat transfer medium of Example 1 is 2150 mass ppm. On the contrary, Comparative Example in the table shows a heat transfer medium including an orthosilicic acid ester in an amount of 24 mass ppm as silicon atoms and a triazole of 1000 mass ppm relative to the entire heat transfer medium.

The total amount of the orthosilicic acid ester as silicon atoms and the triazole of Comparative Example is 1024 mass ppm.

TABLE 1

| | Composition | | |
|---|---|---|---|
| | TEOS (silicon) | Triazole | Total |
| Example 1 | 150 ppm | 2000 ppm | 2150 ppm |
| Comparative Example | 24 ppm | 1000 ppm | 1024 ppm |

Figure 4:
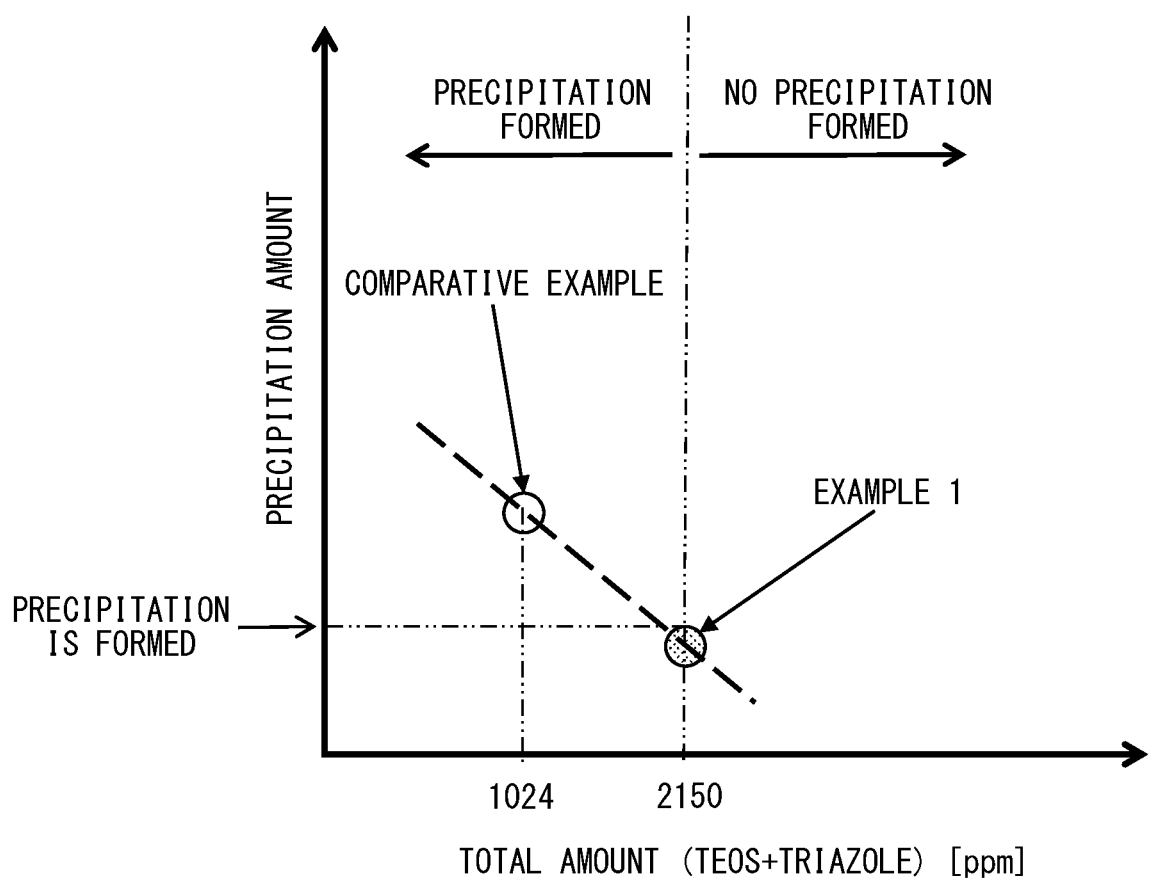
FIG. 4 is a graph showing a relation between the amount of precipitation and the total amount of an orthosilicic acid ester and a triazole in the heat transfer medium.

FIG. 4 shows a graph indicating a relation between a precipitation amount and the total amount of the silicon of the orthosilicic acid ester and the triazole. As shown in FIG. 4, a precipitation of the orthosilicic acid ester is formed in the heat transfer medium according to Comparative Example. On the other hand, no precipitation of the orthosilicic acid ester is formed in the heat transfer medium according to Example 1. According to the experimental results, if the total amount of the orthosilicic acid ester as silicon atoms and the triazole is 2150 mass ppm or more relative to the entire heat transfer medium, formation of a precipitation of the orthosilicic acid ester can be prevented.

Furthermore, according to the experimental result, it is preferable if the mass concentration of triazole relative to the entire heat transfer medium is greater than the mass concentration of silicon of the orthosilicic acid ester relative to the entire heat transfer medium. In the second embodiment, since an ion rust inhibitor such as a trizole is contained in the heat transfer medium. Thus. the amount of the orthosilicic acid ester in the heat transfer medium can be reduced. For example, the mass concentration of the orthosilicic acid ester as silicon atoms relative to the entire heat transfer medium is preferably within a range between 40 mass ppm, non-inclusive, and 150 mass ppm, inclusive.

Other Embodiments (1) The order of connecting the heat receiver 16, the refrigerant heat exchanger 18, the air heat exchanger 20, the oil heat exchanger 22, and the inverter heat exchanger 24, which are components of the heat transfer medium circuit 12, is not necessarily limited to the order shown in FIG. 1, and the order can be changed. Further, the heat receiver 16, the refrigerant heat exchanger 18, the air heat exchanger 20, the oil heat exchanger 22, and the inverter heat exchanger 24 may be connected to each other in an annular shape without the flow path switching unit 28.

(2) In the first embodiment, the system 10 includes the air heat exchanger 20, the oil heat exchanger 22, the oil heat exchanger 22, and the inverter heat exchanger 24. However, the system 10 may include only one or two of the heat exchangers 20, 22, 24. Alternatively, in the system 10, the heat exchangers 20, 22 and 24 may be eliminated.

(3) In the first embodiment, the first refrigerant radiator 44 is used as a radiator for heating the air 61 for heating the vehicle cabin. However, the first refrigerant radiator 44 may be used as a radiator for other heating purposes. Further, in the first embodiment, the system 10 includes the first refrigerant radiator 44 and the refrigerant heat absorber 50. However, the system 10 may eliminate the first refrigerant radiator 44 and the refrigerant heat absorber 50.

(4) In each of the above-described embodiments, the water containing the freezing point depression agent is used as the base material of the heat transfer medium 14. However, an organic solvent may be used as the base material of the heat transfer medium 14. When the heat transfer medium 14 includes an organic solvent, gases are generated from the heat transfer medium 14 when the organic solvent is vaporized. In this case, the gases generated when an organic solvent is vaporized may work as the hydrogen gases described in each of the above-described embodiments. Furthermore, in this case, the portion of each of the heat receiver 16, the refrigerant heat exchanger 18, the air heat exchanger 20, the oil heat exchanger 22, and the inverter heat exchanger 24 that is in contact with the heat transfer medium 14 may be not necessarily made of a material containing aluminum.

The present disclosure is not limited to the foregoing description of the embodiments and can be modified. The present disclosure may also be varied in many ways. Such variations are not to be regarded as departure from the disclosure, and all such modifications are intended to be included within the scope of the disclosure. The above embodiments are not independent of each other, and can be appropriately combined except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Further, in each of the embodiments described above, when materials, shapes, positional relationships, and the like, of the components and the like, are mentioned, they are not limited to these materials, shapes, positional relationships, and the like, unless otherwise specified and unless limited to specific materials, shapes, positional relationships, and the like.

(Overview)

According to a first aspect described in a part or the whole of each of the embodiments, the vehicle thermal management system includes the vehicle driving battery that generates heat during charging or discharging, the liquid heat transfer medium that transfers heat from the battery, a heat receiver that causes the heat transfer medium to receive heat from the battery through heat exchange, and a refrigerant heat exchanger that causes the heat transfer medium to release the heat through heat exchange with a refrigerant of the cooling cycle system. The heat transfer medium includes a liquid base material and an orthosilicic acid ester compatible with the base material and does not include an ionic rust inhibitor.

According to a second aspect, the vehicle thermal management system further includes an air heat exchanger that causes the heat transfer medium to release heat through heat exchange with an air outside of the vehicle. Accordingly, as compared with a situation where the heat transfer medium releases heat only at the refrigerant heat exchanger, a heat releasing amount from the heat transfer medium can be increased by allowing the heat transfer medium to release heat at both the refrigerant heat exchanger and the air heat exchanger. Therefore, the battery cooling capacity of the system can be increased.

According to a third aspect, the vehicle thermal management system further includes the oil heat exchanger that causes the heat transfer medium to further receive heat through heat exchange with an oil for cooling a motor generator. Accordingly, the motor generator can be cooled using the heat transfer medium. The outdoor heat exchanger is a radiator to dissipate heat from the refrigerant. According to this system, when the radiator that causes the refrigerant of the cooling cycle system to release heat is used for heating, the exhaust heat from the motor generator can be used as a heat source for the heat absorber of the refrigeration cycle system.

According to a fourth aspect, the vehicle thermal management system further includes an inverter heat exchanger that causes the heat transfer medium to further receive heat through heat exchange with an inverter. Accordingly, the inverter can be cooled using the heat transfer medium. The outdoor heat exchanger is a radiator to dissipate heat from the refrigerant. According to this system, when the radiator that causes the refrigerant of the cooling cycle system to release heat is used for heating, the exhaust heat from the inverter can be used as a heat source for the heat absorber of the refrigeration cycle system.

According to a fifth aspect, at least one of the heat receiver and the refrigerant heat exchanger includes a portion that is in contact with the heat transfer medium and is made of a material containing aluminum. The base material includes water.

According to a sixth aspect, the air heat exchanger includes a portion that is in contact with the heat transfer medium and is made of a material containing aluminum. The base material includes water.

According to a seventh aspect, the oil heat exchanger includes a portion that is in contact with the heat transfer medium and is made of a material containing aluminum. The base material includes water.

According to an eighth aspect, the inverter heat exchanger includes a portion that is in contact with the heat transfer medium and is made of a material containing aluminum. The base material includes water.

When the portion in contact with the heat transfer medium is made of a material containing aluminum and the heat transfer medium includes water, hydrogen may be generated due to electrochemical reaction of water at the portion in contact with the heat transfer medium. However, according to the fifth to eighth aspects, since the heat transfer medium contains the orthosilicic acid ester, generation of the hydrogen can be suppressed.

According to a ninth aspect, the vehicle thermal management system further includes an ion exchanger that is configured to capture ions generated in the heat transfer medium. Accordingly, even if ions are generated in the heat transfer medium, the heat transfer medium can maintain its high electric insulation property.

According to a tenth aspect, the vehicle thermal management system includes a vehicle driving battery that generates heat during charging or discharging, a liquid heat transfer medium that transfers heat received from the battery, a heat receiver that causes the heat transfer medium to receive heat from the battery through heat exchange, and a refrigerant heat exchanger that causes the heat transfer medium to release the heat through heat exchange with a refrigerant of a cooling cycle system. The heat transfer medium includes a liquid base material and an orthosilicic acid ester compatible with the base material and has an electric insulation property.

Accordingly, the heat transfer medium includes an orthosilicic acid ester and has an electric insulation property. Since the heat transfer medium includes the orthosilicic acid ester, the heat transfer medium has a rust inhibiting property. Therefore, the amount of the ionic rust inhibitor included in the heat transfer medium with the orthosilicic acid ester can be reduced as compared with the heat transfer medium including the ionic rust inhibitor without the orthosilicic acid ester. That is, the electrical conductivity of the heat transfer medium can be lowered as compared with the heat transfer medium with an ionic rust inhibitor. As a result, an electrical insulation property can be given to the heat transfer medium.

In this system, a heat transfer medium having an electric insulation property is used. This eliminates the need for taking the above-mentioned measures against a liquid short circuit. Therefore, it is possible to avoid a situation where the amount of heat transferred from the battery to the heat transfer medium is reduced by taking the above-mentioned measures against the liquid short circuit. In other words, according to this system, the flow rate of the heat transfer medium can be set or the heat receiver can be used for the battery so that the amount of heat transferred from the battery to the heat transfer medium is increased without the concern of occurrence of the short circuit. Therefore, the cooling performance of the refrigeration cycle system can be sufficiently provided when cooling the battery.

Further, according to an eleventh aspect, the heat transfer medium has electrical conductivity of 500 µS/cm or less. As described above, the heat transfer medium has an electric insulation property with the electrical conductivity of 500 µS/cm or less. As a result, it is possible to avoid occurrence of a liquid short circuit even when the heat transfer medium is leaked and comes into contact with the battery.

The invention claimed is:

1. A vehicle thermal management system mounted in a vehicle, the system comprising:
   a vehicle driving battery that is configured to be charged with electric power supplied from an external power source such that heat can be generated during charging and discharging;
   a liquid heat transfer medium through which heat received from the battery can be transferred;
   a heat receiver that is configured to cause the heat transfer medium to receive heat through heat exchange with the battery, the heat receiver including a portion that is in contact with the heat transfer medium and is made of a material containing aluminum; and
   a refrigerant heat exchanger that is configured to cause the heat transfer medium to release heat through heat exchange with a refrigerant for a cooling cycle system, the refrigerant heat exchanger including a portion that is in contact with the heat transfer medium and is made of a material containing aluminum, wherein
   the heat transfer medium includes a liquid base material including water, an orthosilicic acid ester compatible with the liquid base material, and an azole derivative and has an electric insulation property, and
   a total amount of the orthosilicic acid ester and a triazole as the azole derivative is at least 2,150 mass ppm relative to the entire heat transfer medium.

2. The vehicle thermal management system according to claim 1, wherein
   the heat transfer medium has an electrical conductivity of 50 pS/cm or less.

3. A heat transfer medium for a vehicle thermal management system that includes:
- a vehicle driving battery that is configured to be charged with electric power supplied from an external power source such that heat can be generated during charging and discharging;
- a heat receiver that is configured to cause the heat transfer medium to receive heat through heat exchange with the battery, the heat receiver including a portion that is in contact with the heat transfer medium and is made of a material containing aluminum; and
- a refrigerant heat exchanger that is configured to cause the heat transfer medium to release heat through heat exchange with a refrigerant for a cooling cycle system, the refrigerant heat exchanger including a portion that is in contact with the heat transfer medium and is made of a material containing aluminum, the heat transfer medium comprising:
- a liquid base material including water;
- an orthosilicic acid ester compatible with the liquid base material; and
- an azole derivative, wherein
- the heat transfer medium has an electric insulation property, and
- a total amount of the orthosilicic acid ester and a triazole as the azole derivative is at least 2150 mass ppm relative to the entire heat transfer medium.

4. The heat transfer medium according to claim 3, wherein the heat transfer medium has an electrical conductivity of 50 µS/cm or less.

5. A method for cooling a vehicle driving battery that generates heat during charging and discharging, the method comprising:
- circulating a heat transfer medium through a heat transfer medium circuit, the heat transfer medium comprising:
  - a liquid base material including water;
  - an orthosilicic acid ester compatible with the liquid base material; and
  - an azole derivative, wherein
  - the heat transfer medium has an electric insulation property, and
  - a total amount of the orthosilicic acid ester and a triazole as the azole derivative is at least 2150 mass ppm relative to the entire heat transfer medium;
- causing, at a heat receiver including a portion that is in contact with the heat transfer medium and is made of a material containing aluminum, the heat transfer medium to receive heat through heat exchange between the heat transfer medium and the battery that is configured to be charged with electric power supplied from an external power source; and
- causing, at a refrigerant heat exchanger including a portion that is in contact with the heat transfer medium and is made of a material containing aluminum, the heat transfer medium to release heat through heat exchange between a refrigerant for a cooling cycle circuit and the heat transfer medium having received heat.

6. The method according to claim 5, further comprising causing, at an air heat exchanger including a portion that is in contact with the heat transfer medium and is made of a material containing aluminum, the heat transfer medium to further release heat through heat exchange between the heat transfer medium and air outside of the vehicle.

7. The method according to claim 5, further comprising causing, at an oil heat exchanger including a portion that is in contact with the heat transfer medium and is made of a material containing aluminum, the heat transfer medium to further receive heat through heat exchange between the heat transfer medium and an oil for cooling a motor generator.

8. The method according to claim 5, further comprising causing, at an inverter heat exchanger including a portion that is in contact with the heat transfer medium and is made of a material containing aluminum, the heat transfer medium to further receive heat through heat exchange between the heat transfer medium and an inverter.

* * * * *